United States Patent

Welch et al.

[15] 3,650,095

[45] Mar. 21, 1972

[54] GAS FILTER MOUNTING STRUCTURE

[72] Inventors: Wilson A. Welch; William A. Medcalf, both of Louisville, Ky.

[22] Filed: Jan. 21, 1969

[21] Appl. No.: 792,623

[52] U.S. Cl. .................................. 55/493, 55/498, 55/502, 55/521
[51] Int. Cl. ........................................................ B01d 27/08
[58] Field of Search .................... 55/490, 493, 498, 500, 510, 55/502, 521; 210/478, 480, 493, 485

[56] References Cited

UNITED STATES PATENTS 3,486,626  12/1969  Close ........................................ 55/498

Primary Examiner—Frank W. Lutter
Assistant Examiner—Bernard Nozick
Attorney—Leonard Rawicz, Frederick J. Lees, Alvin S. Bass, Marvin F. Matthews and Marvin J. Marnock

[57] ABSTRACT

An improved gas filter comprising at least two arc-like filter housing sectors connected in end-to-end relationship to form an annular ring, the ring including sealing strips cooperable with the peripheral wall and adjacent ends of the sectors to permit gas tight engagement of the filter ring relative an annular passage of a plenum defining housing.

3 Claims, 5 Drawing Figures

PATENTED MAR 21 1972
3,650,095
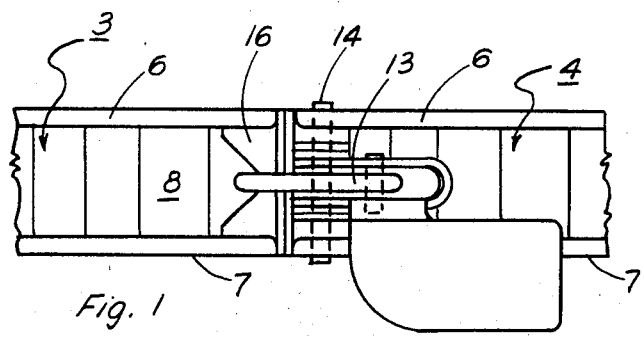
Fig. 1
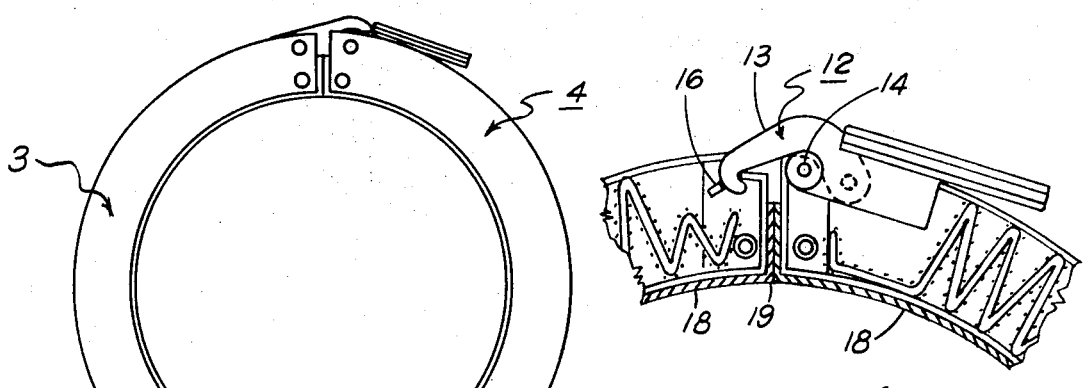
Fig. 4
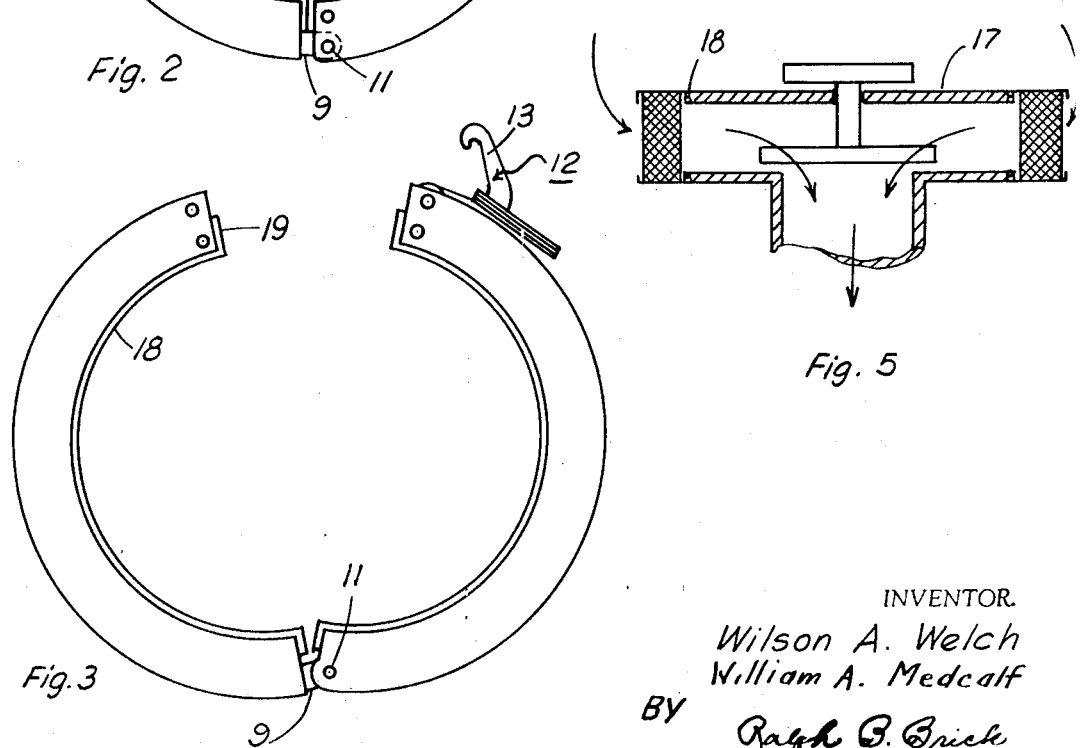
Fig. 2
Fig. 3
Fig. 5
INVENTOR.
Wilson A. Welch
William A. Medcalf
BY
Ralph G. Brick
ATTORNEY 3,650,095

GAS FILTER MOUNTING STRUCTURE

ORIGIN OF THE INVENTION

The invention described herein was made in the performance of work under a NASA contract and is subject to the provisions of Section 305 of the National Aeronautics and Space Act of 1958, public Law 85-568 (72 stat. 435, 42 U.S.C. 2457).

BACKGROUND OF THE INVENTION

The present invention relates to an improved filter apparatus for gas separation, and more particularly, to a new, useful and unobvious arrangement of a ring-type filter structure cooperable with an annular passage of a plenum defining housing.

A number of filter cell arrangements are known in the art of gas filtration to secure filter cells in sealed relation to their support frames. These past arrangements have included complex, time-consuming and expensive apparatus to fasten the cell to its support frame and have required application of edge sealant materials along a multitude of possible leak passages between the cell and the frame.

SUMMARY OF THE INVENTION

The present invention, recognizing that past mounting arrangements have presented problems in construction, mounting, sealing, wear, clamping and leakage, as well as problems in filter cell access and removal, provides a filter cell and mounting arrangement which is straightforward and economical in construction and maintenance, allowing quick installation and removal with a minimum of leakage and a maximum of access for installation and removal. In addition, the present invention provides an arrangement which permits accurate alignment of a filter cell on its support frame, requiring a minimum application of edge sealant materials.

Various other features of the present invention will become obvious to one skilled in the art upon reading the disclosure set forth herein.

More particularly, the present invention provides a ring-shaped filter adaptable to surround an annular passage of a plenum defining housing to permit gas flow between the interior of the plenum housing and the exterior of the housing comprising: at least two arclike housing sectors, each including spaced opposed wall members having filter media disposed therebetween, the sectors being disposed in end-to-end connected relationship to form a ring with one pair of adjacent ends of the end-to-end sectors being held together by perimetric positioned releasable clamp means; and sealing strips disposed along the peripheral edges of the opposed wall members and between the ends thereof to permit gastight engagement of the filter about the annular passage of the plenum defining housing.

It is to be understood that various changes can be made in the arrangement, form, and construction of the apparatus disclosed herein without departing from the scope or spirit of the present invention.

Referring to the drawing which discloses one advantageous embodiment of the present invention:

FIG. 1 is a side elevational view of a portion of two filter frame sectors including a releasable clamp means cooperable between adjacent ends thereof;

FIG. 2 is a slightly reduced plan view of the filter frame of FIG. 1 disclosing the frame in closed position;

FIG. 3 is a plan view of the frame of FIG. 1 disclosing the frame in open position;

FIG. 4 is an enlarged, broken-away plan view of the frame of FIGS. 1 to 3, disclosing the releasable latch means in closed position; and FIG. 5 is a reduced view of the frame of FIGS. 1 to 4, disclosing the frame surrounding an annular passage of a plenum defining housing.

Referring to the drawing, the novel filter frame is disclosed as including two arclike filter frame sectors 3 and 4. It is to be understood that the present invention is not limited to a two sector ring, but that additional sectors can be used to make up a ring.

As can be seen in FIG. 1 of the drawing, each sector includes spaced opposed wall members 6 and 7, which can be formed from any one of a number of suitable materials, and advantageously, are formed from a lightweight gauge aluminum. Disposed in pleated fashion between spaced opposed wall members 6 and 7 is a suitable filter media 8. Advantageously, media 8 can be a random lay fiber glass material with a small amount of organic binder. It is to be understood that other types of filter media can be utilized, and that the filter media need not be pleated if a lesser amount of media surface is desirable. Suitable sealing gaskets which can be of silicone rubber are provided along the edges of the filter media to assure that the edges are in perfectly sealed engagement with wall members 6 and 7.

As can be seen in FIG. 2 of the drawing, wall members 6 and 7 of one end sector 3 are provided with spaced opposed extension arms 9. The spaced wall members of the other end sector 4 receive the arms 9 in overlapping relationship and the walls and extension arms are provided with aligned apertures to receive pin 11 so as to permit opening and closing of the ring-shaped frame which they form about an annular passage of a plenum housing to which the frame is mounted. The other ends of sectors 3 and 4 can be held together by a suitable perimetric releasable clamp 12. Clamp 12 includes a hand-operated overcenter hooked end latch member 13 pivotally mounted about pin 14 intermediate spaced opposed wall members 6 and 7 at one end of one of a pair of adjacent ends of sectors 3 and 4 to extend longitudinally along the periphery of the ring-shaped filter. The other end of the other pair of adjacent ends of sectors 3 and 4 is provided with a V-notched keeper 16 suitably disposed to receive the hook portion of hook latch 13. Accordingly, when sectors 3 and 4 are placed in end-to-end relationship, the hook engages into the V-shaped notch to exert a tightening effect along the periphery of the ring-shaped filter.

In order to insure effective sealing engagement of the ring-shaped filter formed by sectors 3 and 4 with an annular passage of a plenum chamber such as that disclosed at 17 in FIG. 5, suitable sealing strips 18 are disposed along the peripheral edges of the opposed wall members 6 and 7 and between the ends thereof as at 19 to permit gastight engagement of the filter frame about the annular passage of the plenum defining housing, the peripheral forces of the releasable latch member serving to tighten the sealing strips around the housing and to place the ends thereof in closed sealing engagement therewith.

We claim:

1. A ring-shaped filter adaptable to surround an annular passage of a plenum defining housing to permit gas flow between the interior of the plenum housing and the exterior of said housing comprising at least two arclike semicircular filter frame sectors, each including a pair of substantially flat semicircular spaced opposed joined and parallel gas impervious wall members having semicircular filter media disposed therebetween with the edges of the media engaging said opposed wall members, said sectors being disposed in end-to-end hingedly connected relationship to form said ring with one pair of adjacent ends of said end-to-end sectors being held together by perimetric releasable clamp means connected to at least one of said sectors; and sealing strips disposed along the peripheral edges of said opposed wall members and between the ends thereof to permit gastight engagement of said filter frame about said annular passage of said plenum defining housing.

2. The apparatus of claim 1, said other pairs of adjacent ends of said end-to-end sectors being held together pivotally by pivot means positioned adjacent the outer periphery of said sectors, the sealing strip being positioned along the interior peripheral edges of said wall members.

3. The apparatus of claim 1, said releasable clamp means comprising an overcenter hook latch pivotally mounted intermediate said spaced opposed wall members at one end of said pair of adjacent ends of said sectors to extend longitudinally along the periphery of said ring-shaped filter, said other end of said pair of adjacent ends of said sectors having a V-notched keeper disposed therein to receive the hook portion of said hook latch.

* * * * *